United States Patent [19]

Bassett et al.

[11] 4,225,892

[45] Sep. 30, 1980

[54] WEAR RESISTANT MAGNETORESTRICTIVE HEAD

[75] Inventors: Roger D. Bassett, Westminister, Colo.; Gerald A. Daughenbaugh; Davis S. Fields, Jr., both of Tucson, Ariz.; Wayne McCormick, Arvada, Colo.; Rhodes W. Polleys, Tucson, Ariz.; Ralph D. Silkensen, Tucson, Ariz.; Gerald Steving, Tucson, Ariz.

[73] Assignee: International Business Machines Corporation, Armonk, N.Y.

[21] Appl. No.: 9,321

[22] Filed: Feb. 5, 1979

[51] Int. Cl.³ .................... G11B 5/30; G11B 5/12; G11B 5/22

[52] U.S. Cl. .................................. 360/113; 360/122

[58] Field of Search ............... 360/113, 122, 125; 324/119

[56] References Cited

U.S. PATENT DOCUMENTS

| | | | |
|---|---|---|---|
| 3,493,694 | 2/1970 | Hunt | 360/113 |
| 3,932,022 | 1/1976 | Henning et al. | 350/96 R |
| 4,036,723 | 7/1977 | Schwartz et al. | 360/113 |

FOREIGN PATENT DOCUMENTS 458867 10/1975 U.S.S.R. .................... 360/122

OTHER PUBLICATIONS

IBM Tech. Disc. Bull., G. Bate et al., Magnetoresistive Head, vol. 18, No. 6, pp. 1750-1751.
Journal of Applied Physics, on Wear of Sapphire, R. P. Steijn, vol. 32, No. 10, 1951-1958, Oct. 1961.
Journal of Applied Physics, Friction and Wear of Single-Crystal Sapphire Sliding on Steel, E. J. Duwell, vol. 33, No. 9, Sep. 1962.
Acta Metallurgica, Plastic Deformation of Single Crystals of Sapphire: Basal Slip and Twinning, M. L. Kronberg, vol. 5, 1957.

*Primary Examiner*—Alfred H. Eddleman
*Attorney, Agent, or Firm*—James A. Pershon; William N. Hogg

[57] ABSTRACT

An MR head is disclosed in which the MR element is deposited onto a sapphire substrate with a particular crystallographic orientation and a sapphire closure piece also having a particular crystallographic orientation is used. The substrate has the MR element deposited onto either the {0001} or the {11$\bar{2}$0} plane with the {1$\bar{1}$00} plane being oriented as the wear surface. The closure piece has either the {11$\bar{2}$0} or the {0001} plane facing the MR material and the {1$\bar{1}$00} plane oriented as the wear surface.

4 Claims, 5 Drawing Figures

WEAR RESISTANT MAGNETORESTRICTIVE HEAD

BACKGROUND OF THE INVENTION

This invention relates to Magnetoresistive (MR) sensing heads, and more particularly to MR heads which are moved across magnetic marks which represent encoded information. It is particularly related to MR heads for sensing information encoded on products, and automatic recording and tabulation thereof.

One of the important areas of MR sensing is in the recording and tabulating of data affixed to consumer products, such as in a supermarket, or department store wherein articles are encoded with price and other information by means of magnetic markings. These markings are "read" by a wand with an MR head being passed over the markings in contact with the encoded information.

In the design of the head, the MR element must be slightly recessed from the sensing surface of the head to avoid premature failure of the sensor. In the past, one specific form which this head has taken is a silicon wafer substrate onto which the MR material is deposited which is then closed by a sapphire wafer. Sapphire has been selected because it is very hard and generally wear resistant, while silicon had been selected since it is isotropic, provides good adhesion to deposited films and is easy to polish. The silicon, however, has proved to be very soft and wear sensitive, wearing rapidly and quickly and allowing the MR element to contact the item being sensed. Thus, while this design works effectively, it has a very short life.

Sapphire is a single crystal $Al_2O_3$ material, and its orientation can be determined by optical or x-ray technique. The physical properties of the crystal, e.g. thermal expansion, hardness, etc. are dependent upon, and vary greatly with different orientation.

Attempts to use sapphire without control of orientation as both substrate and closure pieces have proved ineffective for several reasons. One principal reason is that the performance of these has been very erratic, some working well for periods of time, while others fail quickly from chipping and/or wear. Also, the manufacturing yield of the pieces has also been very erratic with some batches having extremely low yield.

SUMMARY OF THE INVENTION

According to the present invention, it has been found that very long life heads, and satisfactory manufacturing yields of MR heads can be obtained if both the substrate and the closure pieces are formed of single crystal sapphire pieces having specific wafer plane crystallographic orientation and specific wear plane crystallographic orientation. Specifically, the substrate crystal has the MR element deposited onto $\{0001\}$ plane (preferably over a thin layer of $Al_2O_3$) with the $\{1\bar{1}00\}$ plane being oriented as the wear surface. The closure piece has the $\{11\bar{2}0\}$ plane oriented toward the $\{0001\}$ plane of the substrate and the $\{1\bar{1}00\}$ plane oriented as the wear surface.

DESCRIPTION OF THE PREFERRED EMBODIMENTS

According to the present invention, an improved MR head is provided wherein a single crystal sapphire is used as a substrate onto which is deposited an MR film, preferably over a very thin, e.g., several thousand angstroms, layer of $Al_2O_3$. Without the $Al_2O_3$ there is high background noise and providing this thin film of $Al_2O_3$ serves to minimize such background noise. A single crystal sapphire is used as a closure piece bonded onto the substrate abutting the MR film. It has been found that in order to achieve satisfactory manufacturing yield, and satisfactory performance of the head under operating conditions that require rubbing contact for the sensing function, both the substrate element and the closure element must have very specific crystallographic orientations both for the wafer plane and the plane of the wear surface. When these are specifically controlled, outstanding characteristics are provided.

Figures 1, 2:
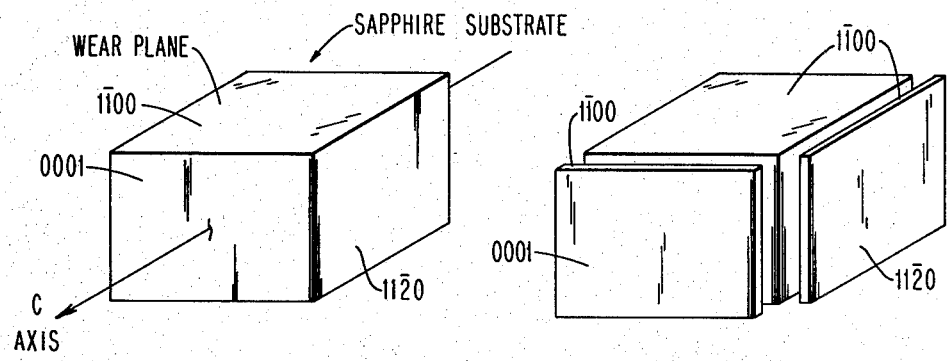
FIG. 1 is a representation of a single crystal sapphire with certain of the planes being designated by their Miller indices.
FIG. 2 is a representation of the orientation of the substrate and the closure pieces as they relate to the structure of a single crystal sapphire.

FIG. 1 shows diagrammatically certain planes of a sapphire crystal denoted by the Miller indices for each plane. Herein the notation used is that used by Kronberg in Acta Metallurgica Vol. 5, 1957, page 507 et seq wherein the single crystal is treated as pseudo hexagonal. In this system the $C/A_1$ ratio of the unit cell is 2.73. As used herein, the Miller indices refer to the "forms" of planes with identical crystallographic characteristics, e.g. $\{0001\}$ includes $(0001)$ and $(000\bar{1})$ planes; and $\{1\bar{1}00\}$ includes the $(1\bar{1}00)$, $(\bar{1}100)$, $(10\bar{1}0)$, $(\bar{1}010)$, $(0\bar{1}10)$, and $(01\bar{1}0)$ planes. However, it should be understood that sapphire does not have the full six-fold symmetry of a true hexagonal system although it does have full three-fold symmetry. Consistent with this, slight physical differences have been found in certain of the various planes in the "forms" but these have been minor and can be ignored for the present purposes and the system treated as a hexagonal system. Thus for the present invention, the properties exhibited are essentially six-fold around the C axis and two-fold around the basal plane.

It has been found that when the substrate onto which the MR material is deposited is structured such that the MR material is deposited onto the $\{0001\}$ basal plane and the $\{1\bar{1}00\}$ plane is oriented as the wear surface, and when the closure piece is cut such that the $\{11\bar{2}0\}$ plane is the interface plane facing the $\{0001\}$ plane of the substrate and the $\{1\bar{1}00\}$ plane is oriented as the wear surface outstanding properties are achieved. These two orientations are shown diagrammatically in FIG. 2 as they relate to the sapphire crystal, and in FIG. 3 as a representation of how the two are mated with the substrate having the MR element deposited thereon.

In the manufacture of the heads, a single crystal sapphire is first oriented and then the desired slice is made as illustrated in FIG. 2 to obtain a wafer for the substrate having the proper orientation. A layer a few thousand angstroms thick of $Al_2O_3$ is then deposited onto the {0001} plane and over that the MR material which preferably is an iron alloy which has a positive magnetostriction as described in application Ser. No. 9,320 filed Feb. 5, 1979 entitled Magnetostrictive Material is deposited; after conventional photolithographic techniques, this large wafer is then diced, and each diced wafer used for a substrate.

Figures 3, 4:
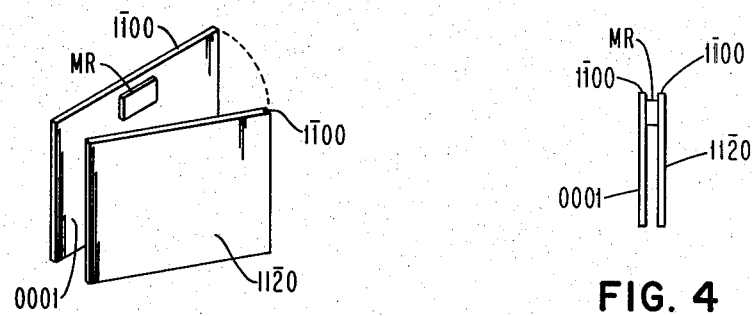
FIG. 3 is a representation of how the closure piece and substrate piece are positioned to form an MR head.
FIG. 4 is a side elevational view, somewhat diagrammatic of the MR head formed of the substrate and closure piece.
Figure 5:
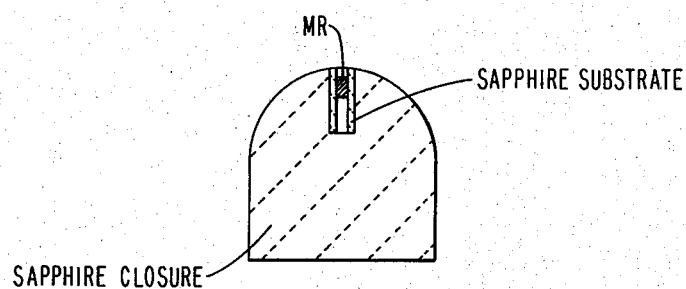
FIG. 5 is a sectional view, somewhat diagrammatic showing an MR head in the tip of a wand.

Similarly, a slice is made as indicated in FIG. 2 from a single sapphire crystal for the closure piece and this is then diced to form closure pieces for closing over the substrate. These substrate and closure pieces are mated as shown in FIG. 4 and then inserted into a head structure, and an appropriate contour is ground and lapped on this surface, to provide a final structure as illustrated in FIG. 5.

It has been found that this particular arrangement of the planes of the substrate and closure pieces provides outstanding wear properties and exceptionally high manufacturing yields.

Table I below shows certain characteristics on a qualitative scale of sapphire pieces having certain orientations.

TABLE I

| Sample Orientation | | Mfg. Yield | | Magnetic Performance | Wear Characteristics | |
|---|---|---|---|---|---|---|
| Wear Plane | Plane | Grind | Dice | | Homogeneous | Chipping |
| {0001} | {1100} | Very Good | Very Good | Excellent | Very Good | Directional but acceptable |
| {1120} | {0001} | Bad | Need Special Technique | Bad | Bad | Bad |
| {1120} | {1100} | Very Good | Need Special Technique | Good | Very Good | Very Good |

With reference to Table I, it can be seen that when the {0001} plane is the wear plane, there is very poor manufacturing yield as well as bad chipping and homogenous wear. Also, this orientation provides poor manufacturing yield. As contrasted thereto, the {1100} plane as a wear surface is a very good wear surface, with some directional properties being shown when the substrate plane is the {0001} plane. However, these are entirely acceptable in the present structure.

With respect to dicing, when the substrate plane is the {1120} plane, then dicing problems are encountered which require special slurry sawing techniques. Such techniques are feasible on the closure piece since there is no MR material deposited thereon. However, such techniques have certain serious limitations with pieces having MR material deposited on the substrate plane and, hence, this particular orientation is less preferred for the substrate sapphire piece. Thus, while the chipping properties using the {0001} plane as the substrate plane are slightly inferior to the chipping properties when using the {1120} plane as the substrate, the dicing yield is low enough with the {1120} plane as a substrate that the preferred orientation of the substrate plane for the base is the {0001} with the {1100} plane as the wear plane. Where such special dicing techniques can be used, especially as with the closure piece, the substrate plane should be the {1120} plane and the wear plane the {1100} plane. Also if either the lower manufacturing yield is tolerable or more expensive techniques are utilized, then this orientation can be used for the substrate as well as the closure. Also the {0001} plane can be used for the closure piece oriented toward the MR material, but it is less desirable than the {1120} plane.

In the case of wear characteristic, there are two aspects which must be considered. First there is the homogenous or uniform wear. This refers to uniform wearing away of the tip as it is being used. The other is a localized nonuniform or nonhomogeneous effect characterized by cratering on the surface or chipping at the edges. Chips that penetrate along the edge of the substrate to the MR element lead to premature failure, as does a high uniform wear rate. In both categories the {0001} plane oriented as a wear surface is bad. The {1100} is a good plane from both aspects. It is slightly better when the substrate plane is {1120} as opposed to the substrate plane being {0001}. However, both are fully acceptable. Also, as compared to a silicon substrate, and sapphire closure which wears in a stepped configuration, a sapphire closure combined with the MR element deposited on a sapphire substrate with the sapphire pieces each having proper orientations wears in a uniform manner without generating a step.

Table II below shows the performance of various substrate and wear plane orientations in an abrasive wear test. In one test configuration a piece having the indicated orientation is abraded against unused nonmodified magnetic oxide media, and in the other test configuration is abraded against a magnetic oxide media having applied thereto a particulate abrasive dust.

TABLE II

| Orientation | | Relative Wear Rate per Unit Time | |
|---|---|---|---|
| Wear Plane | Substrate Plane | Unused Media | Abrasive Dust On Media |
| {0001} | {1120} | 82.7 (D) | 22,500 (A) |
| {0001} | {1100} | 20.0 (B) | 21,500 (C) |
| {1100} | {1120} | .85 (C) | 15,400 (A) |
| {1100} | {0001} | 1.00 (C) | 10,000 (D) |
| {1120} | {0001} | 116.0 (B) | 4,150 (B) |
| {1120} | {1100} | | 10,400 (C) |

(A) Average of 4 samples
(B) One sample
(C) Average of 2 samles
(D) Average of 3 samples Table II shows clearly the superior wear properties under operative conditions of the {1100} wear plane. With clean unmodified media, this is clearly evident, and even with the much harsher case using abrasion dust, there is noticeable improvement. The clean or unused media represents a mild test case and the dusted media represents an extreme abrasive case. In both tests, the {1100} wear plane is significantly better.

The data using the {1120} wear plane is inconclusive.

What is claimed is:

1. In an MR sensing head wherein the MR film is deposited on a sapphire wafer substrate, and a sapphire wafer closure overlies the MR film to define a sensor element, and wherein the sensor element has a contact surface defined by two end surfaces of the substrate and closure piece with the MR element disposed between said wafers and recessed from said surface, the improvement which comprises, said substrate being a single crystal sapphire having the MR element deposited onto the {0001} plane with the {1100} plane being oriented as the magnetic media contact surface thereof, said closure being a single sapphire crystal having its $\{11\bar{2}0\}$ plane facing the plane of the base on which the MR material is depicted and with its $\{1\bar{1}00\}$ plane being oriented as the magnetic media contact surface thereof.

2. The invention as defined in claim 1 wherein a layer of $Al_2O_3$ is deposited on the plane of the substrate as the base on which the MR element is deposited.

3. In an MR sensing head wherein the MR film is deposited on a sapphire wafer substrate, and a sapphire wafer closure overlies the MR film to define a sensor element, and wherein the sensor element has a contact surface defined by two end surfaces of the substrate and closure piece with the MR element disposed between said wafers and recessed from said surface, the improvement which comprises, said substrate being a single crystal sapphire having the MR element deposited onto the $\{11\bar{2}0\}$ plane with the $\{1\bar{1}00\}$ plane being oriented as the magnetic media contact surface thereof, said closure being a single sapphire crystal having its $\{0001\}$ plane facing the plane of the base on which the MR material is depicted and with its $\{1\bar{1}00\}$ plane being oriented as the magnetic media contact surface thereof.

4. A magnetic head for sensing magnetic transitions from a media comprising:

a magnetoresistive element; and a single crystal sapphire material encompassing said magnetoresistive element on two sides, wherein the sapphire material of a first side has the $\{0001\}$ plane placed adjacent said magnetoresistive element with the $\{1\bar{1}00\}$ plane being oriented as the surface plane adjacent the media and the sapphire on the second side has the $\{11\bar{2}0\}$ plane placed adjacent said magnetoresistive element and facing the $\{0001\}$ plane of the sapphire material of the first side and with its $\{1\bar{1}00\}$ plane being oriented as the surface plane adjacent the media.

* * * * *